United States Patent
Kalavala

(10) Patent No.: US 12,105,849 B2
(45) Date of Patent: Oct. 1, 2024

(54) METHOD AND SYSTEM FOR PROVIDING RECOMMENDATIONS TO USERS BY SECURELY ACCESSING USER SENSITIVE DATA

(71) Applicant: Wipro Limited, Bangalore (IN)

(72) Inventor: Balasubramanya Nagaraj Kalavala, Hillsborough, NJ (US)

(73) Assignee: Wipro Limited, Bangalore (IN)

( * ) Notice: Subject to any disclaimer, the term of this patent is extended or adjusted under 35 U.S.C. 154(b) by 266 days.

(21) Appl. No.: 17/658,463

(22) Filed: Apr. 8, 2022

(65) Prior Publication Data

US 2023/0325531 A1     Oct. 12, 2023

(51) Int. Cl.
*G06F 21/62* (2013.01)
*G06F 21/00* (2013.01)
*G06Q 30/0601* (2023.01)

(52) U.S. Cl.
CPC ........ *G06F 21/629* (2013.01); *G06F 21/6245* (2013.01); *G06Q 30/0631* (2013.01)

(58) Field of Classification Search
CPC . G06Q 30/0631; G06F 21/6245; G06F 21/60; G06F 21/604; G06F 21/6209; G06F 21/6218; G06F 21/6227; G06F 21/629
See application file for complete search history.

(56) References Cited

U.S. PATENT DOCUMENTS

| | | | |
|---|---|---|---|
| 2015/0264024 A1 | 9/2015 | Frank | |
| 2019/0140836 A1 | 5/2019 | Novak et al. | |
| 2020/0067922 A1* | 2/2020 | Avetisov | H04L 63/0823 |
| 2020/0153629 A1 | 5/2020 | Yitbarek et al. | |
| 2020/0167488 A1 | 5/2020 | Yitbarek et al. | |

* cited by examiner

*Primary Examiner* — Edward Zee
(74) *Attorney, Agent, or Firm* — Finnegan, Henderson, Farabow, Garrett & Dunner, LLP

(57) ABSTRACT

A method and a system for providing recommendations to users by securely accessing user sensitive data in a trusted execution environment (TEE) is disclosed. The method includes receive a request comprising a unique user identifier for accessing user sensitive data corresponding to at least one user. The method further includes validating a source of the request; providing an access to the user sensitive data upon identifying the source of the request to be the trusted application. The method for providing the access includes hosting a secure application session with the trusted application based on the unique secret key. The method further includes processing the user sensitive data for generating one or more user specific product and service recommendations corresponding to each of the at least one user; and rendering the one or more user specific product and service recommendations to each of the at least one user.

19 Claims, 9 Drawing Sheets

METHOD AND SYSTEM FOR PROVIDING RECOMMENDATIONS TO USERS BY SECURELY ACCESSING USER SENSITIVE DATA

TECHNICAL FIELD

This disclosure relates generally to secure access of data. More particularly, the invention relates to a method and a system for providing recommendations to users by securely accessing user sensitive data in a trusted execution environment (TEE).

BACKGROUND

In current technological world, software applications used for handling user sensitive data that are confidential and private are encrypted in transit and are at rest. Conventionally, end user personal information is stored and used by third party organizations. Every outlet (physical or online) that user visits, stores personal information of users and uses it without users' permission in creating targeted marketing materials, analyzing users' preference for their business advantage, or the like. Another conventional mechanism used to secure user sensitive data physically includes private data centers. These private data centers would not be of any use in case of public cloud, as service providers has access to applications and user sensitive data hosted in their offerings on the public cloud.

Many technologies exists that focuses on providing a Trusted Execution Environments (TEEs) for securely accessing user's personal information, such as, end-to-end encryption of communication to develop TEE, secure communication means for verification of identity of user, trust establishment between two TEEs in a platform launched with TEEs with one or more operating systems hosted in the execution environment, and a hardware accelerator with hardware, firmware, or computer memory for communication between application deployed in the TEE to enhance computing memory. However, none of the existing technologies provides a mechanism for secure computing with embedded trust based on location for sharing and storing personal information of the user.

Therefore, there is a need for a method and system that is robust and efficient for providing recommendations to users by providing end user an ability to configure use of their personal information for computational purposes along with storing and sharing of the personal information for further use.

SUMMARY

In an embodiment, a method for providing recommendations to users by securely accessing user sensitive data in a trusted execution environment (TEE) is disclosed. In one embodiment, the method may include receiving a request comprising a unique user identifier for accessing user sensitive data corresponding to at least one user. It should be noted that, the user sensitive data is prestored in a data repository. The method may further include validating a source of the request. It should be noted that, the source of the request is at least one of an untrusted application and a trusted application. The method for validating the source of the request comprises comparing the unique user identifier with an application registry. It should be noted that, the application registry comprises a list of trusted applications mapped with the unique user identifier and a unique secret key. The method may further include providing an access to the user sensitive data upon identifying the source of the request to be the trusted application. The method for providing the access comprises hosting a secure application session with the trusted application based on the unique secret key. The method may further include processing the user sensitive data for generating one or more user specific product and service recommendations corresponding to each of the at least one user. The method may further include rendering the one or more user specific product and service recommendations to each of the at least one user.

In another embodiment, a method for creating a trusted execution environment (TEE) for securely accessing sensitive data via a registered application is disclosed. The method may include receiving a request comprising a set of information associated with a plurality of applications. It should be noted that, the set of information comprises an Internet Protocol (IP) address, a name, a characteristic, and a type of each of the plurality of applications. The method may further include generating a unique secret key for each of the plurality of applications based on the associated set of information. It should be noted that, the unique secret key is generated based on configurations of the electronic device. The method may further include mapping each of the plurality of applications with the generated unique secret key. The method for mapping each of the plurality of applications with the generated unique secret key comprises embedding the unique secret key associated to each of the plurality of applications. The method for mapping each of the plurality of applications with the generated unique secret key may further include registering each of the plurality of applications as a trusted application based on the associated unique secret key to create the TEE. The method may further include assessing via the plurality of applications, a user sensitive data associated with each of a plurality of users in the created TEE.

In yet another embodiment, a system for providing recommendations to users by securely accessing user sensitive data in a trusted execution environment (TEE) is disclosed. The system includes a processor and a memory communicatively coupled to the processor, wherein the memory stores processor-executable instructions, which, on execution, causes the processor to receive a request comprising a unique user identifier for accessing user sensitive data corresponding to at least one user. It should be noted that, the user sensitive data is prestored in a data repository. The processor-executable instructions further cause the processor to validate a source of the request. It should be noted that, the source of the request is at least one of an untrusted application and a trusted application. To validate the source of the request, the processor-executable instructions further cause the processor to compare the unique user identifier with an application registry. It should be noted that, the application registry comprises a list of trusted applications mapped with the unique user identifier and a unique secret key. The processor-executable instructions further cause the processor to provide an access to the user sensitive data upon identifying the source of the request to be the trusted application. To provide the access, the processor-executable instructions further cause the processor to host a secure application session with the trusted application based on the unique secret key. The processor-executable instructions further cause the processor to process the user sensitive data for generating one or more user specific product and service recommendations corresponding to each of the at least one user. The processor-executable instructions further cause the processor to render the one or more user specific product and service recommendations to each of the at least one user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
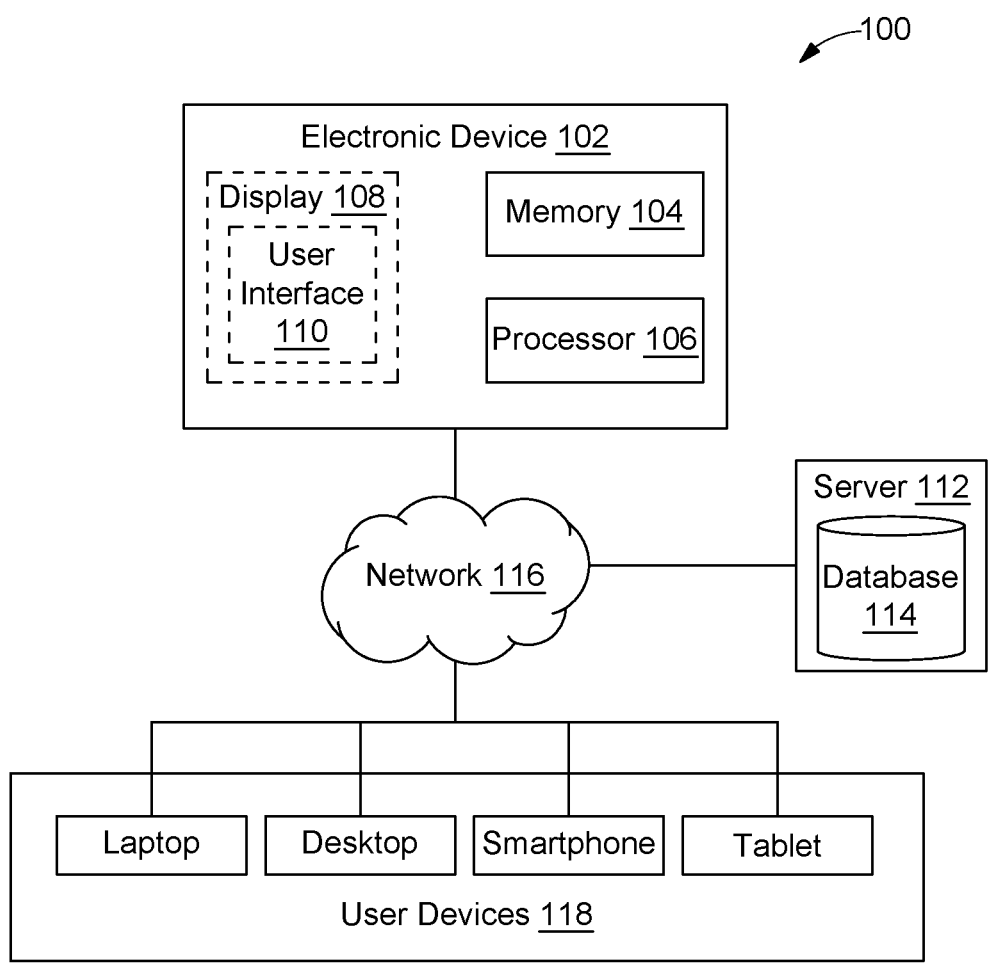
FIG. 1 illustrates a block diagram of a system configured for providing recommendations to users by securely accessing user sensitive data in a trusted execution environment (TEE), in accordance with an embodiment.

A system 100 configured for providing recommendations to users by securely accessing user sensitive data in a trusted execution environment (TEE) is illustrated in FIG. 1. In particular, the system 100 may include an electronic device 102 that may be responsible for providing recommendations to a user by accessing user sensitive data in the TEE. In an embodiment, the user sensitive data may include at least one of name, address, current location, medical history, travel history, user interests, or personalized preferences of user. As will be appreciated, for ease of explanation recommendations provided to a single user has been explained with reference to present FIG. 1. In order to provide recommendations to the user, initially, the electronic device 102 may receive a request. The received request may include a unique user identifier for accessing user sensitive data corresponding to at least one user. Moreover, the unique user identifier may be associated with each of the at least one user. In an embodiment, the user sensitive data may be prestored in a data repository.

Upon receiving the request for accessing the user sensitive data of the at least one user, the electronic device 102 may validate a source of the request. The source of the request may be at least one of an untrusted application and a trusted application. Moreover, in order to validate the source of the request, the electronic device 102 may compare the unique user identifier with an application registry. The application registry may include a list of trusted applications mapped with the unique user identifier and a unique secret key. A method for validating the source of request has been explained in greater detail in conjunction with FIG. 4.

Upon validating the source of the request, the electronic device 102 may provide an access to the user sensitive data to the source of the request. In an embodiment, the access may be provided to the user sensitive data upon identifying the source of the request to be the trusted application. Further, in order to provide access to the user sensitive data, the electronic device 102 may host a secure application session with the trusted application based on the unique secret key. Upon hosting the secure application session, the electronic device 102 may process the user sensitive data for generating one or more user specific product and service recommendations corresponding to each of the at least one user. In an embodiment, the processing of the user sensitive data may be done by the electronic device 102 via a trained Artificial Intelligence (AI) model. Upon generating the one or more user specific product and service recommendations, the electronic device 102 may render the one or more user specific product and service recommendations to each of the at least one user.

Examples of the electronic device 102 may include, but are not limited to, a server, a desktop, a laptop, a notebook, a tablet, a smartphone, a mobile phone, an application server, or the like. The electronic device 102 may further include a memory 104, a processor 106, and the display 108. The display 108 may further include a user interface 110. As described above, the user may interact with the electronic device 102 and vice versa through the display 108.

By way of an example, the display 108 may be used to display intermediate results (i.e., result of validation of the source of the request, the user sensitive data, result of comparison of the unique user identifier with the application registry, etc.,) based on actions performed by the electronic device 102, to the user. Moreover, the display 110 may be used to display final result, i.e., the one or more user specific product and service recommendations, to each of the at least one user.

By way of another example, the user interface 110 may be used by the user to provide inputs to the electronic device 102. Thus, for example, in some embodiment, the user may ingest an input via the electronic device 102 that may include addition or deletion of one or more user sensitive data associate with the user. In another embodiment, the user may ingest input via the electronic device 102 that may include a request for generating an alert notification corresponding to a particular habit specific to the user. Further, for example, in some embodiments, the electronic device 102 may render intermediate results (e.g., result of validation of the source of the request, the user sensitive data, result of comparison of the unique user identifier with the application registry, etc.,) or final results (e.g., the one or more user specific product and service recommendations.) to the user via the user interface 110.

The memory 104 may store instructions that, when executed by the processor 106, may cause the processor 106 to provide the one or more user specific product and service recommendations by the user. As will be described in greater detail in conjunction with FIG. 2 to FIG. 12, in order to provide the one or more user specific product or service recommendations, the processor 106 in conjunction with the memory 104 may perform various functions including reception of the request, validation of the source of the request, comparison of the unique user identifier with the application registry, identification of the source of the request, processing of the user sensitive data, generation of the one or more user specific product and service recommendations, and rendering of the one or more user specific product and service recommendations to the user etc.

The memory 104 may also store various data (e.g., the unique user identifier, the list of trusted applications, the unique secret key, the user sensitive data, the one or more user specific product and service recommendations, etc.,) that may be captured, processed, and/or required by the electronic device 102. The memory 104, in some embodiments, may also include the trained AI model. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random-Access Memory (DRAM), Static Random-Access memory (SRAM), etc.).

Further, the electronic device 102 may interact with a server 112 or user devices 118 over a network 116 for sending and receiving various data. The user devices 118 may be used by a plurality of users to view the one or more user specific product and service recommendations to the electronic device 102. Examples of the user devices 118 may include, but is not limited to, laptop, desktop, smartphone, tablet. The network 116, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiment, the electronic device 102 may fetch each of the user sensitive data associated with each of the at least one user from the server 112. In addition, the server 112 may provide access of information (i.e., the user sensitive data) associated with each of the at least one user. The server 112 may further include a database 114. The database 114 may store the unique the user sensitive data associated with each of the at least one user. By way of an example, the database 114 may store information associated with medical history of each of the at least one user. The database 114 may be periodically updated with new information available for each of the at least one user.

Figure 2:
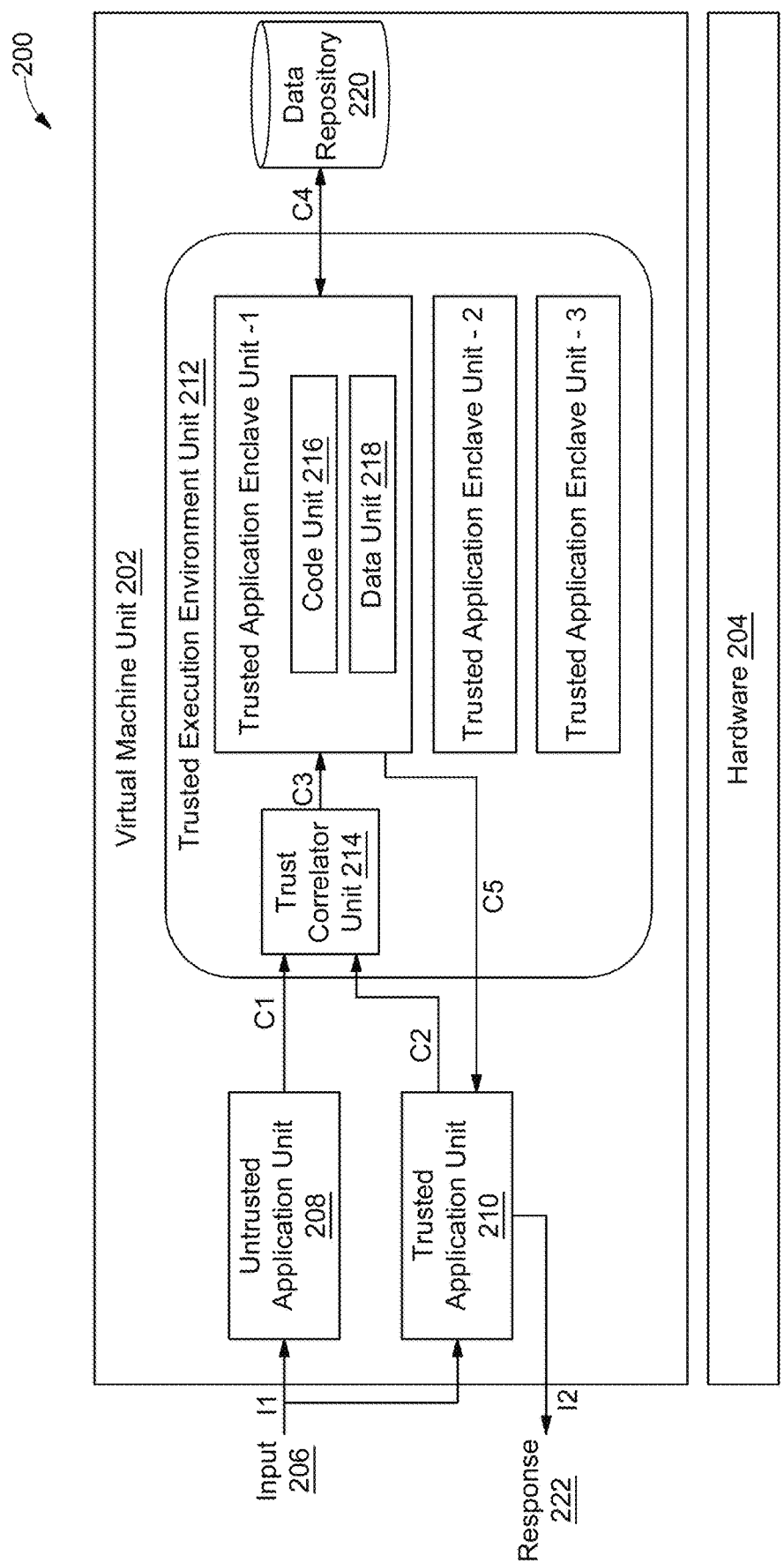
FIG. 2 illustrates a functional block diagram of a system configured for providing recommendations to users by securely accessing user sensitive data in a trusted execution environment (TEE), in accordance with an embodiment.

Referring now to FIG. 2, a functional block diagram of a system 200 configured for providing recommendations to users by securely accessing user sensitive data in a trusted execution environment (TEE) is illustrated, in accordance with an embodiment. In other words, the system 200 illustrated in the present FIG. 2 may be configured to securely compute with embedded trust based on location for sharing and storing private information (i.e., the user sensitive data) of a user. In an embodiment, the system 200 may include a virtual machine unit 202. In reference to FIG. 1, the virtual machine unit 202 may correspond to a virtual environment that may work like a separate device within the electronic device 102. In an embodiment, the virtual machine unit 202 may be deployed on a specific hardware as depicted via a hardware (or a hypervisor) 204.

Further, the virtual machine unit 202 may include an untrusted application unit 208, a trusted application unit 210, a TEE unit 212, and a data repository 220. The TEE unit 212 may further include a trust correlator unit 214, a trusted application enclave unit-1, a trusted application enclave unit-2, and a trusted application enclave unit-3. As will be appreciated, the TEE unit 212 may include a plurality of trusted application enclave units. For ease of explanation, the trusted application enclave unit-1, the trusted application enclave unit-2, and the trusted application enclave unit-3 are considered. The trusted application enclave unit-1 may further include a code unit 216, and a data unit 218. It should be noted that, each of the plurality of trusted application enclave units present in the TEE unit 212 may include a code unit and a data unit. For example, along with the trusted application enclave unit-1, the trusted application enclave unit-2 and the trusted application enclave unit-3 may include their respective code unit and data unit. As will be appreciated, for ease of explanation, the trusted allocation enclave unit-1 including the code unit 216 and the data unit 218 is considered. Additionally, the virtual machine unit 202 may be configured to receive an input 206 and based on processing of the received input 206, the virtual machine unit 202 may provide result of processing as depicted via a response 222.

Initially, the input 206 may be received by the untrusted application unit 208 and the trusted application unit 208 via an interface I1'. In an embodiment, the input 206 may include a set of information associated with the user. The set of information may include a unique user identity and a list of user preferences associated with the user. In an embodiment, the unique user identifier may be created based on a set of user data associated with the user. The set of user data may include, but is not limited to, location, type of electronic device, current position of the user along with data and time. Moreover, the set of information associated with the user may be received from a user avatar or a system avatar. As will be appreciated, the user avatar or the system avatar may correspond to an application with face recognition, fingerprint, ID scanner, or kiosk that receives the set of information from the user.

The untrusted application unit 208 may receive the set of information including the unique user identity and the list of user preferences associated with the user over the interface "I1". In an embodiment, the list of user preferences may depend upon specific interface requirements of the TEE unit 212. After receiving the set of information, the untrusted application unit 208 may generates a request on behalf of the user based on the unique user identifier. In an embodiment, the untrusted application unit 208 may generate the request including the unique user identifier for accessing user sensitive data corresponding to the user. Further, the untrusted application unit 208 may send the generated request including the unique user identifier to the trust correlator unit 214 present within the TEE unit 212 over a connector 'C1'. Upon receiving the request, the trust correlator unit 214 may validate the source of the request. In order to validate the source of the request, the trust correlator unit may request the untrusted application unit 208 to provide a unique secret key. Further, the trust correlator unit 214 may reject the request received from the untrusted application unit 208 due to failure in providing the requested unique secret key. Upon rejecting the request, the trust correlator unit 214 may send a response depicting the rejection of the request to the untrusted application unit 208 over the connector 'C1'. Upon receiving the response, the untrusted application unit 208 may send processed user preferences as applicable to the user (or end-user terminal). This has been further explained in detail in reference to FIG. 5 and FIG. 6.

The trusted application unit 210 may receive the set of information the unique user identity and the list of user preferences associated with the user over the interface "I1". In an embodiment, the list of user preferences may depend upon specific interface requirements of the TEE unit 212. Further, the trusted application unit 210 may generate and send a request to the trust correlator unit 214 within the TEE unit 212 over a connector 'C2'. The request may include the unique user identifier for assessing the user sensitive data corresponding to the user. In an embodiment, the trusted correlator unit 214 may be configured to allow the trusted application unit 210 to communicate with the TEE unit 212. In order to allow the trusted application unit 210 to communicate with the TEE unit 212, the trust correlator unit 214 may validate the source of the request by requesting the associated unique secret key from the trusted application unit 210.

Upon requesting by the trust correlator unit 214, the trusted application unit 210 may transmit the associated unique secret key to the trust correlator unit 214. Upon receiving the associated unique secret key, the trust correlator unit 214 may be configured to uniquely identify the trusted application unit 210 in an application registry, based on the associated unique secret key. The application registry may include the list of trusted applications mapped with the unique user identifier and the unique secret key. In an embodiment, the unique secret key associated with the trusted application unit 210 may be generated beforehand while making the trusted application unit 210 to be trusted by the TEE unit 212. A method for configuring a plurality of applications as the trusted application has been further explained in detail in reference to FIG. 11 and FIG. 12. Once the trusted application unit 210 is uniquely identified based on the unique secret key, then, the request received from the trusted application unit 210 may be further processed. By way of an example, suppose the trusted application unit 210 identified unique based on the unique secret key may correspond to the trusted application enclave unit-1. In an embodiment, every time a new request made by the trusted application unit 210 to the trust correlator unit 214 may include the unique secret key. Upon validation by the trust correlator unit 214, the trusted application unit 210 may receive the access of the user sensitive data from the code unit 216 over a connector 'C5'. After receiving the access of the user sensitive data, the trusted application unit 210 may generate a response 222 to be rendered to the user over an interface 'I2'. In an embodiment, the response 222 may correspond to the one or more user specific product and service recommendations.

The TEE unit 212 may be created as a virtual machine under the hardware 204 designed to protect the plurality of applications deployed as the trusted application that can be accessed only upon establishment of trust. In an embodiment, the request for accessing the user sensitive made by each of the plurality of applications present within the TEE unit 212 may first have to go through authentication via the unique secret key that is unique to each of the plurality of applications. In an embodiment, the TEE unit 212 may include the trust correlator unit 214 and the plurality of trusted application enclave units. As depicted via the present FIG. 2, the plurality of trusted application enclave units may correspond to the trusted application enclave unit-1, the trusted application enclave unit-2, and the trusted application enclave unit-3. It should be noted that, any number of trusted application enclave units may be part of the TEE unit 212 without limiting scope of invention.

The trust correlator unit 214 included within the TEE unit 212 may be configured to receive the request including the unique user identifier from the untrusted application unit 208 over the connector 'C1'. In an embodiment, upon receiving the request from the untrusted application unit 208, the trust correlator unit 214 may validate the source of the request. In order to validate the source of the request, the trust correlator unit 214 my request for the unique secret key from the untrusted application unit 208. Further, due to failure in providing the unique secret key, the trust correlator unit 214 may the request received from the untrusted application unit 208 by notifying that the request is received from the untrusted application unit 208.

Further, the trust correlator unit 214 may be configured to receive the request indicating the unique user identifier from the trusted application unit 210 over the connector 'C2'. Upon receiving the request, the trust correlator unit 214 may validate the source of the request by requesting the unique secret key from the trusted application unit 210. Upon validation that the request is received from the trusted application unit 210, the trust correlator unit 214 may process the unique secret key. The unique secret key may be processed to identify one of the plurality of trust application enclave units within the TEE unit 212 to which the received request must be routed. As depicted via the present FIG. 2, the unique secret key may carry information pertaining to the trusted application enclave unit-1. Upon identification, the trust correlator unit 214 may be configured to route the received request to the trusted application enclave unit-1 accordingly. Finally, the trusted application enclave unit-1 may accept the received request for further processing.

The trusted application enclave unit-1 may be configured to receive the request associated with the trusted application unit 210 after successful validation of the unique secret key as part of session validation from the trust correlator unit 214 over a connector 'C3'. Further, the trusted application enclave unit-1 may be configured to host a secure application along with the unique secret key and secure data handling. In an embodiment, the trusted application enclave unit-1 may be completely protected and isolated within the TEE unit 212. In an embodiment, the request made from either of the untrusted application unit 208 or the trusted application unit 210 may need pass through the TEE unit 212. As depicted via present FIG. 2, the trusted application enclave unit-1 may include the code unit 216 and the data unit 218. The code unit 216 may be accessed only for requests that are pre-authorized. In other words, the code unit 216 may be accessed based on the requests received form each of the plurality of application listed as the trusted application in the list of trusted applications.

Once the secure application session is hosted by the trusted application enclave unit-1, the code unit 216 may be configured to receive the request associated with the trusted application unit 210 for processing with the unique user identifier. After receiving the request, the code unit 214 may extracts the user sensitive data (also referred as user's personal identifiable information) from the data repository 218 over the connector "C4". In other words, the code unit 216 may securely extract the user sensitive data necessary for computation from the data repository 220. In an embodiment, the user sensitive data may be securely extracted via the unique secret key based on the unique user identifier associated with the user. Moreover, the unique secret key of the trusted application unit 210 may be mapped to the unique user identifier and stored in the data repository 220. In an embodiment, the user sensitive data may correspond to confidential data of the user. Upon extracting the user sensitive data, the code unit 216 may store the extracted user sensitive data in the data unit 218 for further processing.

Further, the code unit 214 may include the trained AI model. The trained AI model may be used to process the request based on the extracted user sensitive data for generating the one or more user specific product or service recommendations. The AI model may be trained using historical information associated with each of a plurality of users, such as user's day to day transactional interactions through an end point terminal integrated at stores, online portals, restaurants, medical facilities, etc. The AI model may learn the user's typical usage pattern based on the historical information associated with each of the plurality of users. Further, based on learning from the historical information associated with the user, the trained AI model may generate in run-time, a user specific response, i.e., the one or more of user specific product or service recommendations that needs to be rendered to the user.

For example, the user may have a bad experience regarding health upon visiting a Thai restaurant due to consumption of peanuts in a dish ordered by the user. The trained AI model may then learn this event and utilize this event to provide the response 222 by notifying the user that restaurant in which the user is currently in, is known to use peanuts. This would save the user from having another bad experience regarding health.

The data unit 218 may receive the user sensitive data from the data repository 220 over the connector 'C4'. In an embodiment, the data unit 218 may correspond to a temporary storage used by the code unit 216 to retain a local copy of the user sensitive data fetched from the data repository 220 for usage during processing to provide the one or more user specific product or service recommendations. Further, each of the trusted application enclave unit-2 and the trusted application enclave unit-3 may be configured to host a secure application session between one of the plurality of applications listed as the trusted application and the TEE unit 212, in order to securely access the user sensitive data prestored in the data repository 220. It should be noted that, application rules and application context may be unique for an associated application from the plurality of applications hosted in the trusted application enclave unit-2 and the trusted application enclave unit-3 respectively.

The data repository 220 may store the unique user identifier, the unique secret key along with the user sensitive data that's personal and confidential to the user. The user sensitive data stored in the data repository 220 may be accessible via the unique secret key that adheres to standard of the TEE unit 212. Moreover, every request made by each of the trusted application (i.e., the trusted application unit 210) hosted in the TEE unit 212 may be encrypted with the unique secret key during transmit and use of the user sensitive data. In an embodiment, the data repository 220 may responds to query including the request for accessing the user sensitive data for generating the one or more user specific product or service recommendation from the trusted application enclave unit-1 via the connector 'C4'.

Further, the response 222 may be a matched-up preference that meets user profile based on the user sensitive data that was applied against the list of user preferences. In an embodiment, the response 222 may correspond to the one or more user specific product or service recommendations. As will be appreciated, at no point during transaction and processing, the user sensitive data may be used outside the TEE unit 212. Moreover, when the processing is completed, the transaction in the TEE unit 212 may be completed by destroying the user sensitive data used for generating the one or more user specific product or service recommendations. This eliminates any opportunity for compromising the access of the user sensitive data by the untrusted application unit 208 or alike. In other words, after generating the one or more user specific product or service recommendations, the code unit 216 may erase the user sensitive data stored in the data unit 218. Moreover, the data unit 218 may terminate any link established with the data repository 220. In addition, the data unit 218 may destroy the secure application session hosted to confirm that the transaction is completed as far as the data unit 218 is concerned.

An advantage of proposed mechanism unlike conventional mechanisms may be that the user may be able to control access of their user sensitive data and the one or more user specific product and services provided to each of the at least one user. In order to control the access of their user sensitive data, the user may have control to approve each instance of use of their user sensitive data and not an associated business entity. Additionally, the list of user preferences may not be allowed to be stored by any third-party service provider, thereby allowing the user to control access and storage of the user sensitive data that identifies them. By way of an example, consider a scenario where a user who is allergic to peanuts may visit a grocery store. Upon visiting the grocery store, the user may have to read back of product label or seek assistance of a store expert to learn whether the product being purchased by the user is peanut free or not. This may reveal specific health condition of the user that the user may not be interested to share. Unfortunately for this there is no other way available conventionally.

However, by using the proposed mechanism, the user may store the user sensitive data including medical records that would carry information about peanut allergy of the user in the data repository 220. Upon storing the user sensitive data, when the user may pick up a product in the grocery store and scan the product for purchase, an end point terminal may make a request (also referred as an Application Programming Interface (API) request) through the trusted application unit 210 to seek the one or more user specific product or service recommendation carrying details of ingredients in the product. For this, the code unit 216 in the trusted application enclave unit-1 may compute and identify that the product picked by the user contains peanuts and is not good for health of the user. After identification, the code unit 216 may be configured to relay the response 222 back to the user via the end point terminal. The response 222 may contain an alert notification providing recommendation to the user for not buying the product being picked. In whole process, there is no manual intervention and neither the user sensitive data including medical condition of the user may be disclosed. Moreover, the proposed mechanism may be even more useful in complex health conditions of the user along with situations where the user (for example, a child) cannot be trusted to make right judgement.

Figure 3:
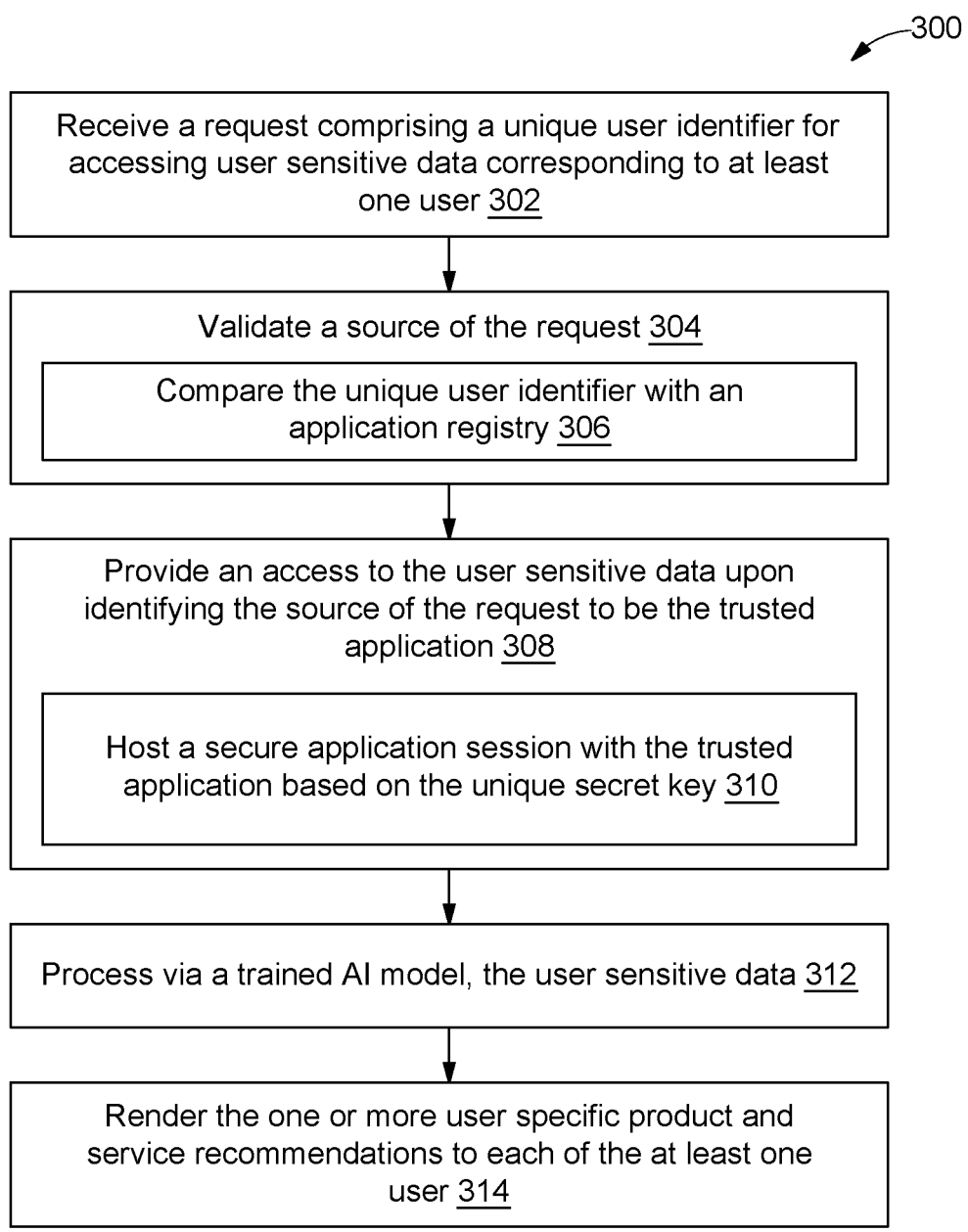
FIG. 3 illustrates a flowchart of a method for providing recommendations to users by securely accessing user sensitive data in a trusted execution environment (TEE), in accordance with an embodiment.

Referring now to FIG. 3, a flowchart of a method 300 for providing recommendations to users by securely accessing user sensitive data in a trusted execution environment (TEE) is illustrated, in accordance with an embodiment. At step 302, a request may be received. In reference to FIG. 2, the request may correspond to the input 206. The received request may include a unique user identifier for accessing user sensitive data corresponding to at least one user. In an embodiment, the user sensitive data may be prestored in a data repository. The user sensitive data may include at least one of name, address, current location, medical history, travel history, user interests, or personalized preferences of user. In reference to FIG. 2, the data repository may correspond to the data repository 220.

Upon receiving the request, at step 304, a source of the request may be validated. In an embodiment, the source of the request may be at least one of an untrusted application and a trusted application. In reference to FIG. 2, the untrusted application may correspond to the untrusted application unit 208. In addition, the trusted application may correspond to the trusted application unit 210. In order to validate the source of the request, at step 306, the unique user identifier may be compared with an application registry. In an embodiment, the application registry may include a list of trusted applications mapped with the unique user identifier and a unique secret key. In reference to FIG. 2, the application registry may be stored in the trust correlator unit 214. A method of validating the source of the request is further explained in detail in conjunction with FIG. 4-FIG. 7.

Upon identifying the source of the request to be the trusted application based on validation of the source of the request, at step 308, an access may be provided to the user sensitive data. In order to provide the access, at step 310, a secure application session may be hosted with the trusted application based on the unique secret key. A method of providing the access to the user sensitive data based on the unique secret key has been further explained in detail in reference to FIG. 8.

Upon receiving the access of the user sensitive data, at step 312, the user sensitive data may be processed. The processing of the user sensitive data may be done for generating one or more user specific product and service recommendations corresponding to each of the at least one user. A method performed for generating the one or more user specific product and service recommendations has been further explained in detail in conjunction with FIG. 9. Once the one or more user specific product and service recommendations are generated, at step 314, the one or more user specific product and service recommendations generated may be rendered to each of the at least one user. This complete method 300 described in present FIG. 3 has been further explained in detail in reference to FIG. 10.

Figure 4:
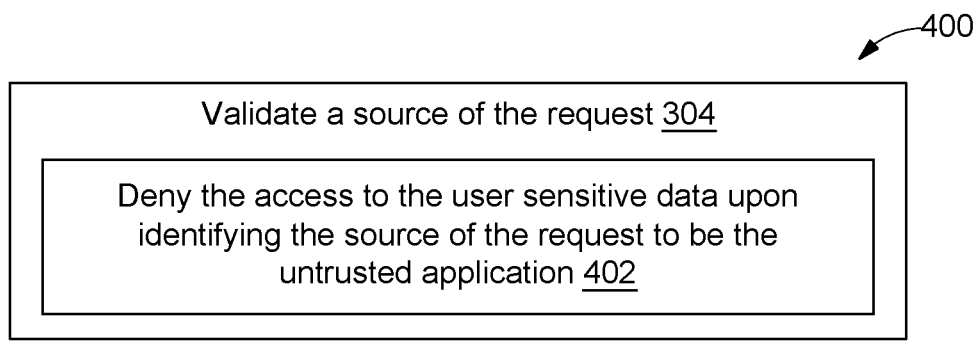
FIG. 4 illustrates a flowchart of a method for validating a source of a request, in accordance with an embodiment.

Referring now to FIG. 4, a flowchart of a method 400 for validating a source of a request is illustrated, in accordance with an embodiment. In reference to FIG. 3, as mentioned via the 304, in order to validate the source of the request the unique user identifier received with the request may be compared with the application registry. In an embodiment, the application registry may include the list of trusted applications mapped with the unique user identifier and the unique secret key. In addition to comparison, in order to validate the source of the request, the unique secret key may be requested from the source of the request. In one embodiment, based on comparison, upon identifying the source of the request to be the untrusted application, at step 402, the access of the user sensitive data may be denied.

In reference to FIG. 2, the untrusted application may correspond to the untrusted application unit 208. A method of identifying the source of request to be the untrusted application has been further explained in detail in reference to FIG. 5 and FIG. 6. In another embodiment, upon identifying the source of the request to be the trusted application, the access to the user sensitive data may be provided to the trusted application. Upon receiving the access, the trusted application may process the user sensitive data to generate the one or more user specific product or service recommendations. A method of identifying the source of the request to be the trusted application has been further explained in detail in reference to FIG. 7.

Figure 5:
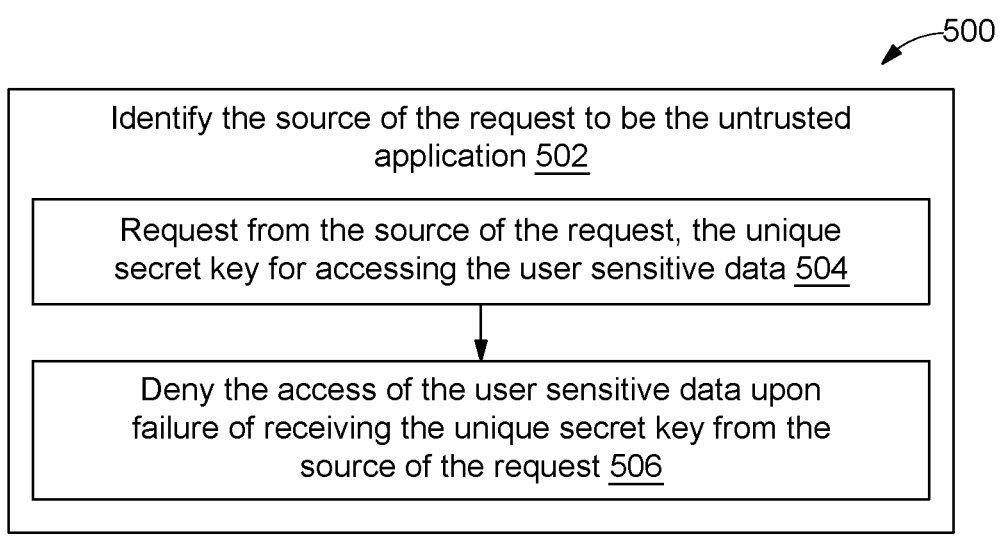
FIG. 5 illustrates a flowchart of a method for identifying a source of a request to be an untrusted application, in accordance with an embodiment.

Referring now to FIG. 5, a flowchart of a method 500 for identifying a source of a request to be an untrusted application is illustrated, in accordance with an embodiment. In order to identify the source of the request to be the untrusted application as mentioned via step 502, at step 504, the unique secret key may be requested from the source of the request for accessing the user sensitive data. In an embodiment, the request received from the source may include the unique user identifier for accessing the user sensitive data corresponding to the at least one user. Further, at step 506, the access of the user sensitive data may be denied upon failure of receiving the unique secret key from the source of the request. In other words, when the source of the request, i.e., the untrusted application may not be able to provide the requested unique secret key, then the access of the user sensitive data may be denied.

In reference to FIG. 2, when the source of the request, i.e., the untrusted application unit 208 may not be able to provide the unique secret key to the trust correlator unit 214, then then the trust correlator unit 214 may deny the access of the user sensitive data by the untrusted application unit 208. It should be noted that, the unique secret key may be generated initially while configuring each of the plurality of applications as the trusted application to create the TEE. A method of configuring the plurality of applications as the trusted application to create the TEE has been explained in detail in reference to FIG. 11 and FIG. 12.

Figure 6:
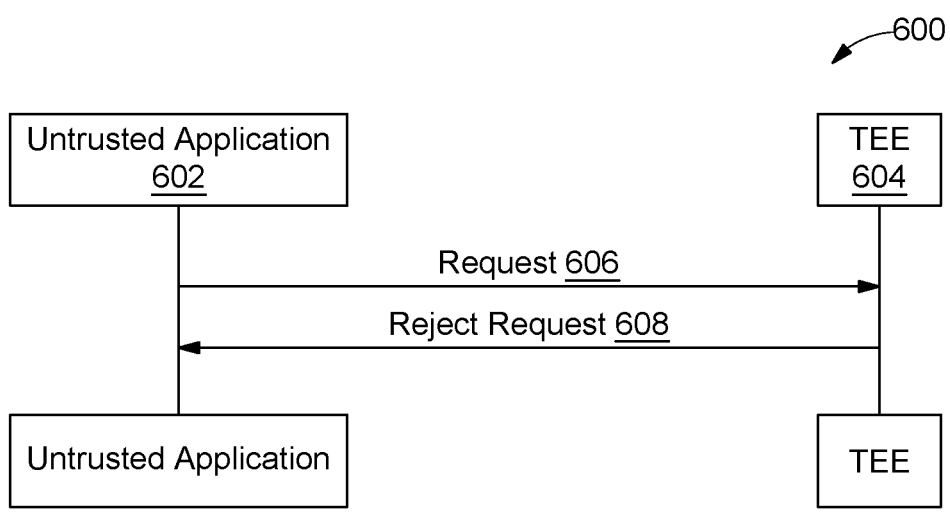
FIG. 6 illustrates a functional flow diagram representing processing of a request received from an untrusted application, in accordance with an exemplary embodiment.

Referring now to FIG. 6, a functional flow diagram 600 representing processing of a request received from an untrusted application is illustrated, in accordance with an exemplary embodiment. The functional flow diagram 600 depicted in the present FIG. 6 may include an untrusted application 602 and a TEE 604. In reference to FIG. 2, the untrusted application 602 may correspond to the untrusted application unit 208. In addition, the TEE 604 may correspond to the TTE unit 212. As will be appreciated, FIG. 6 is explained in conjunction with FIG. 2. Initially, the untrusted application 702 may send a request 606 to the TEE 604. In an embodiment, the request may include the unique user identifier for accessing the user sensitive data corresponding to the at least one user. Upon receiving the request, the TEE 604 may validate the source of the request. In order to validate the, the TEE 604 may request from the source of the request the unique secret key.

Upon failure of providing the unique secret key to the TEE 604, the TEE may determine that the source of the request is the untrusted application 602. Based on validation, the TEE 604 may send the response for rejection of the request depicted as a 'reject request 608' to the untrusted application 602. As will be appreciated, the untrusted application 602 may fail to provide the unique secret key, as the untrusted application may not be present in the application registry that consist of the list of trusted applications mapped with the unique user identifier, and the unique secret key mapped to each application present in the list of trusted application. Moreover, the unique secret key may be generated and mapped to each of the list of trusted applications while making each application as the trusted application. In an embodiment, the request from the untrusted application 602 may be rejected considering the request to be a side-channel attack. In reference to FIG. 2, the untrusted application unit 208 may send the request to the trust correlator unit 214 of the TEE unit 212. Upon receiving the request, the trust correlator unit 214 may validate the request received from the untrusted application unit 208. In order to validate the request, the trust correlator unit 214 may request the untrusted application unit 206 to provide the unique secret key. Upon failure of providing the unique secret key, the trust correlator unit 214 may send a response for rejection of the request to the untrusted application unit 208.

Figure 7:
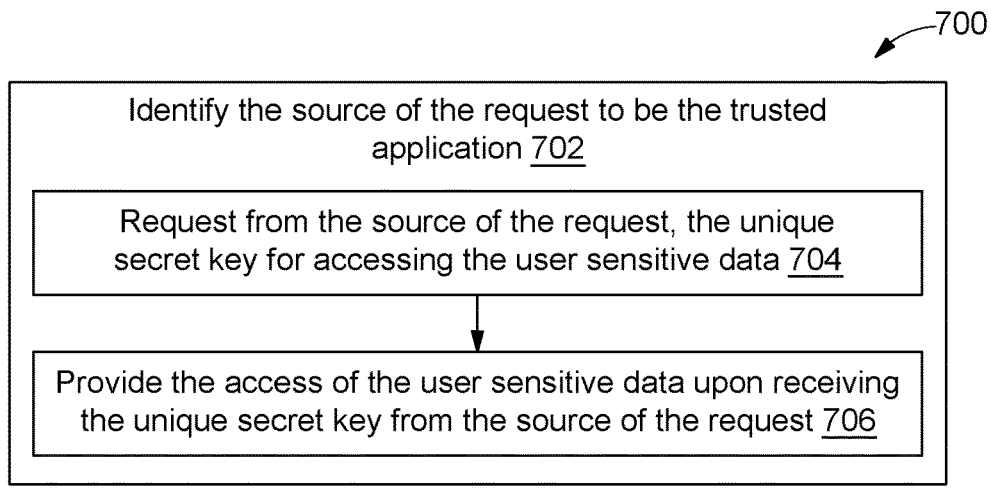
FIG. 7 a flowchart of a method for identifying a source of a request to be a trusted application, in accordance with an embodiment.

Referring now to FIG. 7, a flowchart of a method 700 for identifying a source of a request to be a trusted application is illustrated, in accordance with an embodiment. In order to identify the source of the request to be the trusted application as mentioned via step 702, at step 704, the unique secret key may be requested from the source of the request for accessing the user sensitive data. In an embodiment, the request received from the source may include the unique user identifier for accessing the user sensitive data corresponding to the at least one user. Upon receiving the unique secret key from the source of the request, at step 706, the access of the user sensitive data may be provided to the source of the request. In other words, when the source of the request, i.e., the trusted application may provide the requested unique secret key, then the access of the user sensitive data may be provided to the trusted application.

In reference to FIG. 2, the trusted application may correspond to the trusted application unit 210. Further, upon receiving the request, in order to identify the source of the request to be the trusted application unit 210, the trust correlator unit 214 may request the unique secret key from the trusted application unit 210. Upon receiving the request for the unique secret key, the trusted application unit 210 may provide the associated unique secret key to the trust correlator unit 214. Upon providing the requested unique secret key to the trust correlator unit 214, the trust correlator unit 214 may provide the access of the user sensitive data to the trusted application unit 210. It should be noted that, the unique secret key may be generated initially while configuring each of the plurality of applications as the trusted application to create the TEE. Once the unique secret key associated with each of the plurality of applications are generated, then the generated unique secret key may be assigned to each of the plurality of applications. A method of configuring the plurality of applications as the trusted application to create the TEE has been explained in detail in reference to FIG. 11 and FIG. 12.

Figure 8:
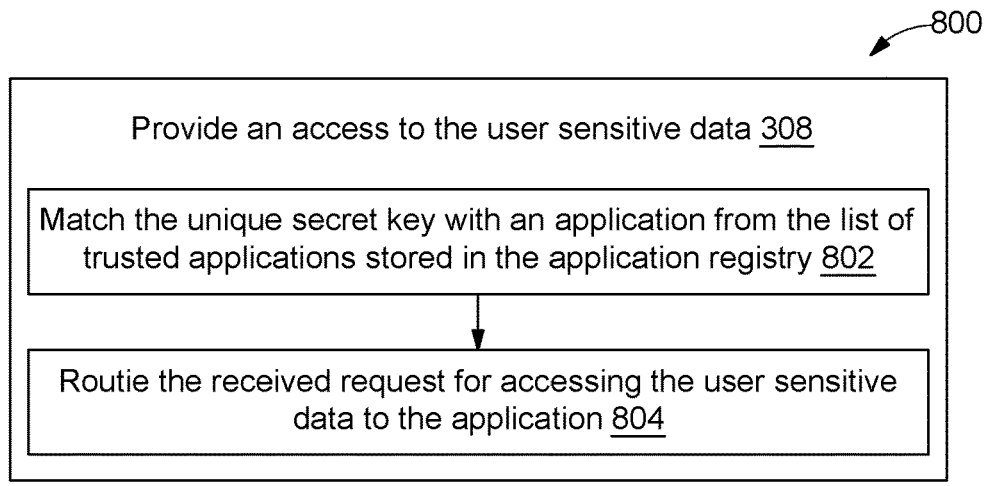
FIG. 8 illustrates a flowchart of a method for providing an access of a user sensitive data, in accordance with an embodiment.

Referring now to FIG. 8, a flowchart of a method 800 for providing an access of a user sensitive data is illustrated, in accordance with an embodiment. In reference to FIG. 3, as mentioned via the step 308, in order to provide the access of the user sensitive data upon identifying the source of the request to be the trusted application, at step 802, the unique secret key may be mapped with an application from the list of trusted applications stored in the application registry. In other words, the unique secret key requested from the source of the request, i.e., the trusted application may be mapped with one of the list of trusted applications. In reference to FIG. 2, the unique key request from the trusted application unit 210 may be mapped with the trusted application enclave unit-1, by the trust correlator unit 214.

Once the mapping of the unique secret key with the application is done, at step 804, the received request for accessing the user sensitive data may be routed to the application. In other words, upon mapping the unique secret key with the application, the application may access the user sensitive data associated with the at least one user based on the unique user identifier associated with the user. In reference to FIG. 2, the application to which the request is routed may correspond to the trusted application enclave unit-1. As already explained in FIG. 2, upon receiving the request, the code unit 216 of the trusted application enclave unit-1 may fetch the user sensitive data from the data repository 220. Upon fetching, the user sensitive data, the code unit 216 may store the local copy of the user sensitive data in the data unit 218 for further processing.

Figure 9:
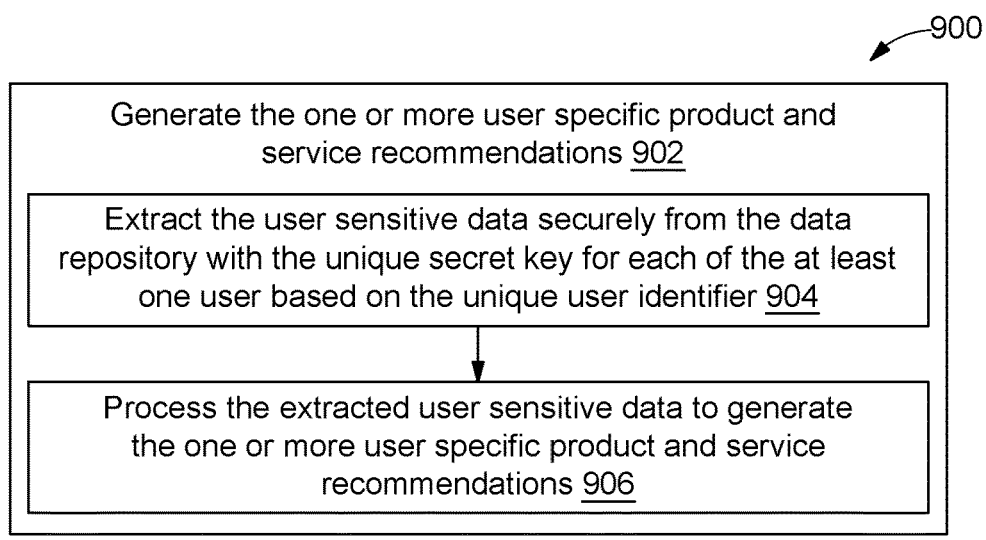
FIG. 9 illustrates a flowchart of a method for generating one or more user specific product and service recommendations, in accordance with an embodiment.

Referring now to FIG. 9, a flowchart of a method 900 for generating one or more user specific product and service recommendations is illustrated, in accordance with an embodiment. In order to generate the one or more user specific product or service recommendations as mentioned via step 902, at step 904, the user sensitive data may be securely extracted from the data repository. In an embodiment, the user sensitive data for each of the at least one user may be extracted from the data repository via the unique secret key based on the unique user identifier associated with each of the at least one user. In reference to FIG. 2, the data repository may correspond to the data repository 220. Upon extracting the user sensitive data, at step 906, the extracted user sensitive data may be processed to generate the one or more user specific product and service recommendations. In an embodiment, the user sensitive data may be processed via the trained AI model. As will be appreciated, the AI model may be initially trained with a labeled dataset for generating a plurality of product or service recommendation. For example, the labeled dataset may include a set of information of a plurality of users and a recommendation associated with each of the set of information. Moreover, the trained AI model may iteratively learn based on a new information associated with each of the plurality of users. In reference to FIG. 2, the code unit of each of the plurality of trusted enclave units may include the trained AI model.

Figure 10:
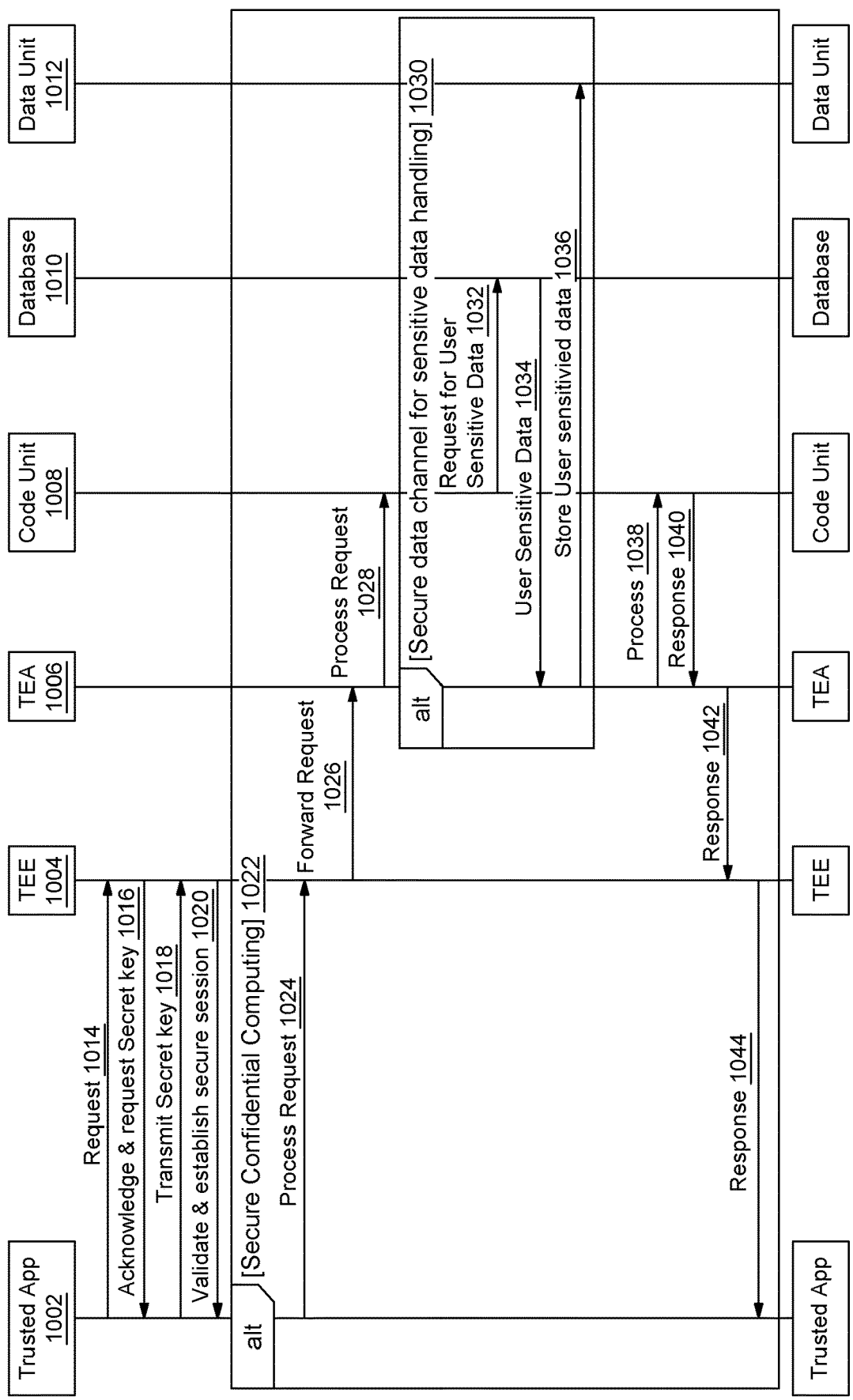
FIG. 10 illustrate a functional flow diagram representing processing of a request received from a trusted application, in accordance with an exemplary embodiment.

Referring now to FIG. 10, a functional flow diagram 1000 representing processing of a request received from a trusted application is illustrated, in accordance with an exemplary embodiment. The functional flow diagram 1000 depicted in the present FIG. 10 may include a trusted application 1002, a TEE 1004, a trusted execution application (TEA) 1006, a code unit 1008, a database 1010, and a data unit 1012. In reference to FIG. 2, the trusted application 1002 may correspond to the trusted application unit 210. The TEE 1004 may correspond to the TTE unit 212. The TEA 1006 may correspond to the trusted application enclave unit-1. The code unit 1008 may correspond to the code unit 216. The database 1010 may correspond to the data repository 220. Additionally, the data unit 1012 may correspond to the data unit 218.

Initially, at step 1014, the trusted application 1002 may send a request to the TEE 1004 for accessing the user sensitive data corresponding to the at least one user. The request may include the unique user identifier corresponding to the at least one user. In response to receiving the request, the TEE 1004 may validate the source of the request. In order to validate the source of the request, at step 1016, the TEE 1004 may send an acknowledgement of receipt of the request. In addition to sending the acknowledgement, the TEE 1004 may also send a request for the unique secret key. In an embodiment, the unique secret key may be initially mapped to each of the plurality of applications registered as the trusted application in the application registry. Upon receiving the request by the trusted application 1002, at step 1018, the trusted application 1002 may send the requested unique secret key to the TEE 1004. Upon receiving the requested unique secret key by the TEE 1004, at step 1020, the TEE 1004 may validate the trusted application 1002. Upon validation, the TEE 1004 may establish a secure application session between the trusted application 1002 and the TEE 1004. In reference to FIG. 2, the validation of the trusted application 1002 and the establishment of the secure application session may be done by the trust correlator unit 214 of the TEE unit 212.

Once the secure application session is established, then in a secure channel depicted via a boundary as a secure confidential computing 1022, the processing of the user sensitive data may happen between the trusted application 1002 and the TEE 1004. Upon establishing the secure application session, at step 1024, the trusted application 1002 may process the request via the TEE 1004. In order to process the request, at step 1026, the TEE 1004 may forward the request to the TEA 1006. Upon receiving the request, at step 1026, the TEA 1006 may forward the request with the unique user identifier to the code unit 1008. In an embodiment, the TEA 1006 may include the code unit 1008 and the data unit 1010.

Upon receiving the request, at step 1028, the code unit 1008 may process the request based on the unique user identifier. In an embodiment, the processing of the request may be done by the code unit 1008 in a secure channel depicted via a boundary as a secure data channel for sensitive data handling 1030. In order to process the request, at step 1032, the code unit 1008 may send a request to access the user sensitive data associated with the user based on the unique user identifier, to the database 1010. Further, upon receiving the request, at step 1034, the database 1010 may send the user sensitive data based on the unique user identifier associated with the user, to the code unit 1008 of the TEA 1006. In an embodiment, the user sensitive data may correspond to confidential data of the user. Upon receiving the user sensitive data, at step 1036, the received user sensitive data may be stored in the data unit 1012. In an embodiment, the data unit 1012 may correspond to a temporary storage used by the code unit 1008 to retain a local copy of the user sensitive data fetched from the database 1010 for usage during processing of the user sensitive data.

Once the local copy of the user sensitive data is stored in the data unit 1012, at step 1038, the TEA 1006 may provide instructions to the code unit 1008 to process the request using the user sensitive data. The code unit 1008 may process the user sensitive data to generate the one or more user specific product or service recommendations. In an embodiment, in order to process the user sensitive data, the code unit 1008 may include the trained AI model. Based on processing of the user sensitive data, at step 1040, the code unit 1008 may send the generated one or more user specific product or service recommendations as a response, to the TEA 1006. Upon receiving the response from the code unit 1008, at step 1042, the TEA 1006 may send the received response to the TEE 1004. Further, upon receiving the response from the TEA 1006, at step 1044, the TEE 1004 may send the received response to the trusted application 1002 that generated the request.

Figure 11:
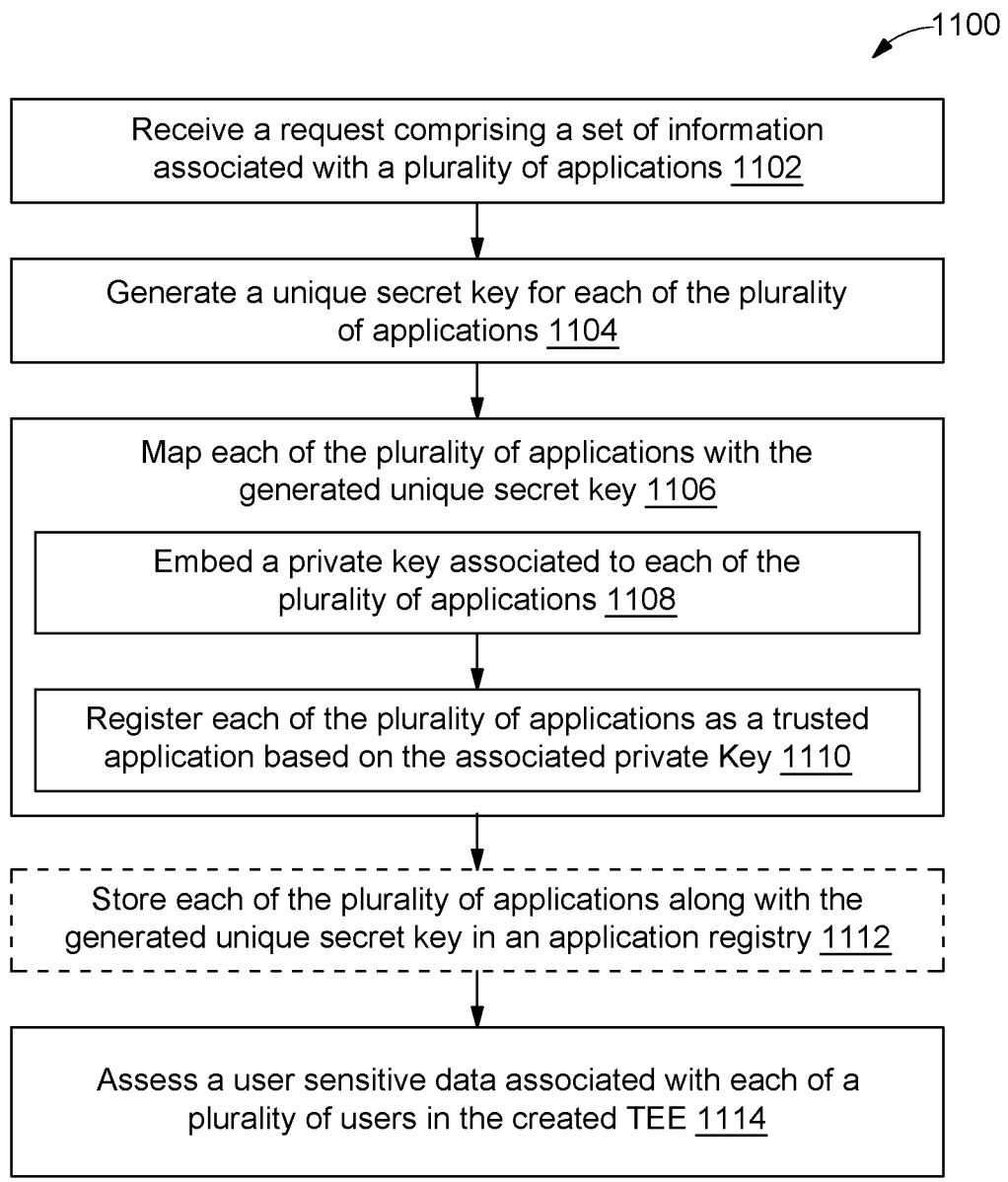
FIG. 11 illustrates a flowchart of a method for creating a trusted execution environment (TEE) for securely accessing user sensitive data via a registered application, in accordance with an embodiment.

Referring now to FIG. 11, a flowchart of a method 1100 for creating a trusted execution environment (TEE) for securely accessing user sensitive data via a registered application is illustrated, in accordance with an embodiment. In order to create the TEE for securely accessing user sensitive data, at step 1102, a request may be received. The received request may include a set of information associated with a plurality of applications. In an embodiment, the set of information may include, but is not limited to, an Internet Protocol (IP) address, a name, a characteristic, and a type of each of the plurality of applications. Upon receiving the request, at step 1104, a unique secret key may be generated for each of the plurality of applications. In an embodiment, the unique secret key may be generated based on the associated set of information. Moreover, the unique secret key may be generated based on configurations of an electronic device. In reference to FIG. 1, the electronic device may correspond to the electronic device 102.

Once the unique secret key is generated, at step 1106, each of the plurality of applications may be mapped with the generated unique secret key. In order to map the unique secret key, at step 1108, the unique secret key associated to each of the plurality of applications may be embedded in each of the plurality of applications. Upon embedding the unique secret key, at step 1110, each of the plurality of applications may be registered as a trusted application. In an embodiment, each of the plurality of applications may be registered as the trusted application based on the associated unique secret key in order to create the TEE.

Upon mapping each of the plurality of applications with the generated unique secret key, at step 1112, each of the plurality of applications along with the generated unique secret key may be stored in an application registry. In reference to FIG. 2, the application registry may be stored in the trust correlator unit 214. Once each of the plurality of application along with the associated generated unique secret key are stored in the application registry, then at step 1114, a user sensitive data associated with each of a plurality of users may be assessed by each of the plurality of application in the created TEE. In reference to FIG. 2, the created TEE may correspond to the TEE unit 212. A method of creating the TEE for securely accessing user sensitive data via the registered application has been further explained in detail in conjunction with FIG. 12.

Figure 12:
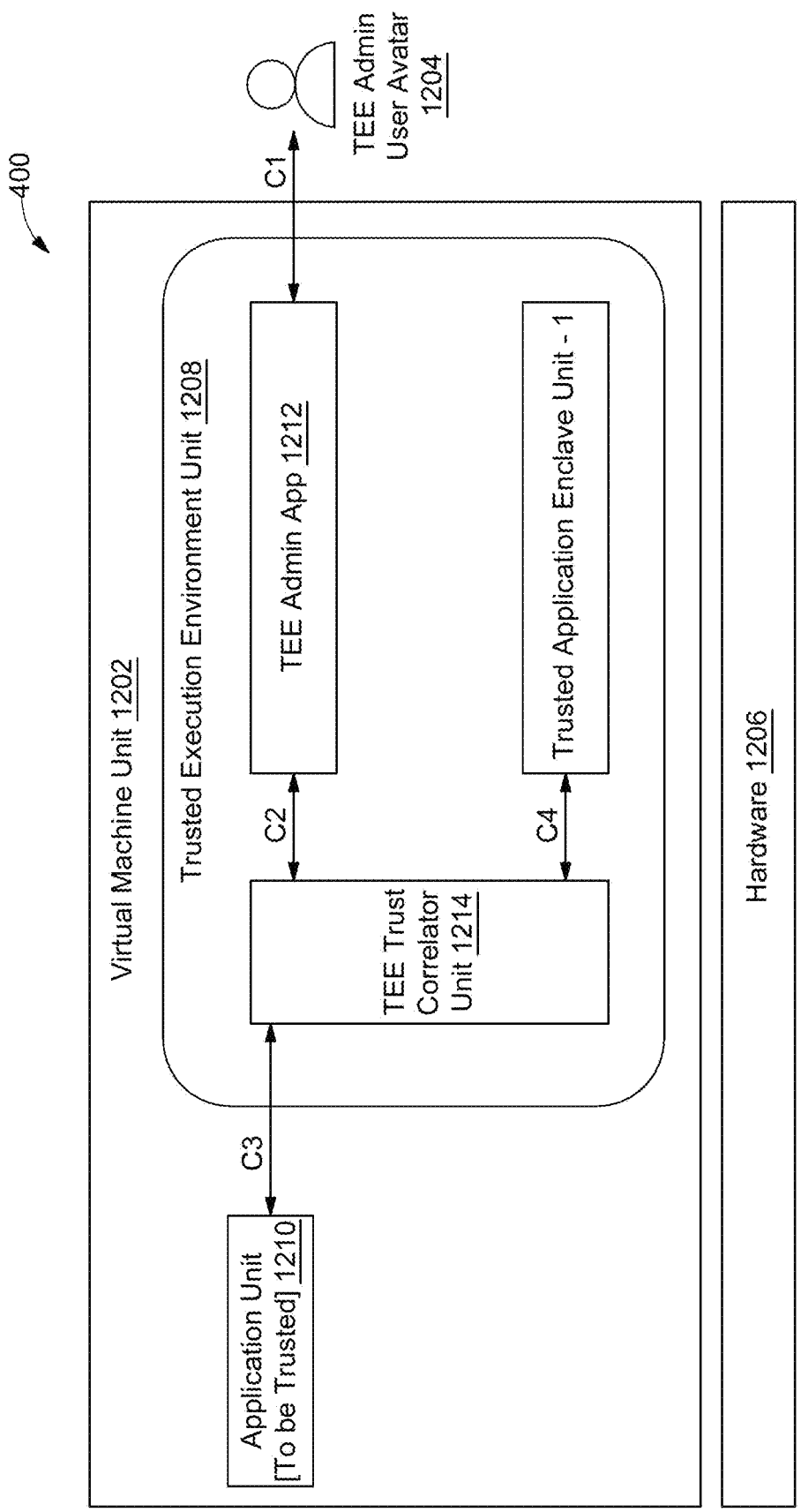
FIG. 12 illustrates a functional block diagram of a system for registering an application as a trusted application, in accordance with an embodiment.

Referring now to FIG. 12, a functional block diagram of a system 1200 for registering an application as a trusted application is illustrated, in accordance with an embodiment. FIG. 12 is explained in conjunction with FIG. 11. In order to create the TEE for securely accessing the user sensitive data corresponding to each of the at least one user, the plurality of applications may need to be registered as the trusted application. As will be appreciated, for ease of explanation, registering of a single application as a trusted application has been explained in reference to present FIG. 12. Moreover, similar method described in present FIG. 12 may be used for registering each of the plurality of applications as the trusted applications to create the TEE.

In order to register the application as the trusted application, the system 1200 may include a virtual machine unit 1202, a TEE admin user avatar 1204, and a hardware 1206. The virtual machine unit 1202 may further include a TEE unit 1208 and an application unit 1210. In an embodiment, the application unit 1210 may correspond to the application that needs to be registered as the trusted application. Moreover, the TEE unit 1208 may include a TEE admin application 1212, a trust correlator unit 1214, and a trusted application enclave unit-1.

In order to generate the unique secret key, the TEE admin avatar 1204 may be utilized by a user (e.g., a developer) to interact with the TEE admin application 1212 of the TEE unit 1208. In an embodiment, the TEE admin avatar may interact with the TEE admin application 1212 for generating the unique secret key corresponding to the application unit 1210 in order to register the application unit 1210 as the trusted application. Moreover, the TEE admin avatar 1204 may interact with the TEE admin application 1212 via a secure login over a connector 'C1'. Once the unique secret key is generated, the generated secret key is mapped with the application unit 1210 in order to register the application unit 1210 as the trusted application.

Once the unique secret key is generated, the trusted application enclave unit-1 of the TEE unit 1208 may be linked with the application unit 1210 via the unique secret key. In an embodiment, the unique secret key may be generated based on the set of information associated with the application unit 1210. The set of information may include, but is not limited to, an IP address, a name, a characteristic, and a type of the application unit 1210. In an embodiment, the unique secret key generated may correspond to a cryptographic key that is unique to the application unit 1210 and the trusted application enclave unit-1 deployed in the TEE unit 1208.

Moreover, parameters considered for generating the unique secret key may include use of the hardware 1206 that supports implementations of the TEE unit 1208. In other words, the TEE unit 1208 configured for generating the unique secret key may generate the unique secret key based on configurations of the hardware 1206 on which the TEE unit 1208 is deployed. In addition to consideration of configurations of the hardware 1206, an operating system that enables fulfillment of requirement of the TEE unit 1208 may be considered. Further, during run-time, the application unit 1210 may access the trusted application enclave unit-1 via the unique secret key. Moreover, by using the unique secret key, the application unit 1210 may adhere to zero trust violation while validating for the source of the request by exclusively linking the trusted application enclave unit-1 with the application unit 1210.

The TEE admin application 1212 may include a set of configuration screens for managing the application registry. In an embodiment, the application registry includes the list of trusted applications mapped with the unique user identifier and the unique secret key. Further, the TEE admin application 1212 may include a management console that will enable an authorized user (also referred as administrator) to login. In order to perform management associated with the unique secret key, the user may need to login to the TEE admin application 1212. Upon login, the authorized user may be navigated to a key management section where each of the unique secret key may be generated, and their public interfaces are maintained to connect and configure the each of the plurality of application to become the trusted application. Moreover, upon logging in to the TEE admin application 1212, the authorized user may perform various management associated with the unique secret key that includes generation of the unique secret key, log history of access of the application unit 1210 associated with the unique secret key, and ability to disable or terminate the unique secret key in order to unregister the application unit 1210.

The trust correlator unit 1214 may be configured to receive the unique secret key from the TEE admin application 1212 over a connector 'C2'. After receiving the unique secret key, the trust correlator unit 1214 may be configured to map the unique secret key with the application unit 1210 and the trusted application enclave unit-1. Further, the trust correlator unit 1214 may be configured to store mapping details of the unique secret key with the application unit 1210 and the trusted application enclave unit-1 in a form of a table for further processing. The stored table may be used in runtime to identify the trusted application enclave unit-1 from the plurality of application enclave units upon receiving a request from the application unit 1210. The trust correlator unit 1214 may identify the trusted application enclave unit-1 based on the unique secret key provided in order to route the request to the trusted application enclave unit-1 for further processing.

Further, the trust correlator unit 1214 may include a repository (also referred as the application registry) of the plurality of trusted applications. The repository may be managed by the TEE admin user avatar 1204 through the TEE admin application 1212. During runtime, the request received from the application unit 1210 to the TEE unit 1208 may be directed to the trust correlator unit 1214 for validation of the application unit 1210 as the trusted application. Only upon successful validation of the application unit 1210, the trust correlator unit 1214 may direct the request to the trusted application enclave unit-1.

Moreover, in order to add a new application unit to the list of trusted applications, the TEE admin user avatar 1204 may need to access the TEE admin application 1212 to generate a new unique secret key for the new application unit. Further, the new unique key generated may be mapped with the new application unit and an associated trusted application enclave unit. In order to generate the new unique secret key, the TEE admin application may need to provide the set of information associated with the new application unit that is needed to be as a trusted application in the list of trusted applications. It should be noted that, the unique secret key may be generated based on configurations of the hardware 1206 deploying the TEE unit 1208 and the set of information associated with the new application unit.

The application unit 1210 may send the request to the trust correlator unit 1214 over a connector 'C3'. The application unit 1210 may be registered as the trusted application by assigning the unique secret key. The unique secret key assigned to the application unit 1210 may be used by the application unit 1210 to communicate with the trusted application enclave unit-1. Once the application unit 1210 is registered as the trusted application, then every request made by the application unit 1210 may be routed by the trusted correlator unit 1214 to the trusted application enclave unit-1. In order to register the application unit 1210 as the trusted application, two main events may need to occur. Initially, the generated unique secret key may need to be embedded into the application unit 1210 so that every request made by the application unit 1210 may have the unique secret key as part of the request. Secondly, the application unit 1210 may that need to be registered as the trusted application in the application registry of the trust correlator unit 1214. Once the application unit 1210 is registered as the trusted application, then any request made by the application unit 1210 with the unique secret key may be successfully validated by the trust correlator unit 1214. Upon validation, the trust correlator unit 1214 may send the request to respective trusted application enclave unit, i.e., the trusted application enclave unit-1. The trusted application enclave unit-1 may be configured to receive the registered requests from the trust correlator unit 1214 over a connector 'C4'. The registered request may correspond to the request received from the application unit 1210 configured as the trusted application Consider a scenario, a person named 'John' may park his vehicle and enters a shopping complex. Upon entering the shopping complex, 'John' makes his way to a bakery. While exploring items to purchase, John may reach in a delicatessen section. Upon reaching the delicatessen section, 'John' may receive a notification on his mobile device via an application implementing the proposed mechanism installed on his mobile device. The notification may include an alert that "this bakery uses peanuts in delicatessen section, please ensure not to touch or consume anything as you are highly allergic to peanuts". This may save 'John' from taking medication or running to a doctor for urgent care. After exiting the bakery, 'John' may make his way to pharmacy store. Upon reaching the pharmacy store, the 'John' may again receive a notification on his mobile device via the installed application. The notification may include an alert that "John, you are running short on tablets for your allergy treatment, it's over the counter drug, please ensure to purchase while you are in the pharmacy store". This may help 'John' to manage his health needs better by alerting him when required.

Consider another scenario, where a person named 'Tracy' went to a luxury mall and went to a shop from where she purchased a cartful of expensive clothes and jewelry. As she approaches towards a payment counter, she receives an alert notification on her electronic device (e.g., a mobile device) via the application implementing proposed mechanism installed on her device. The alert notification comprising a message, "Tracy, based on preference set by your credit card transactions, you are going to make payment that will be declined in the shop you are currently in". Tracy immediately remembered that to curb her addiction to expensive shopping habits, she had setup a request to track her whereabouts and block use of her credit card when specified cash flow limit has been reached. With the help of the proposed mechanism, upon receiving the notification Tracy may have avoided an embarrassing experience she would have had at the payment counter of the shop.

Figure 13:
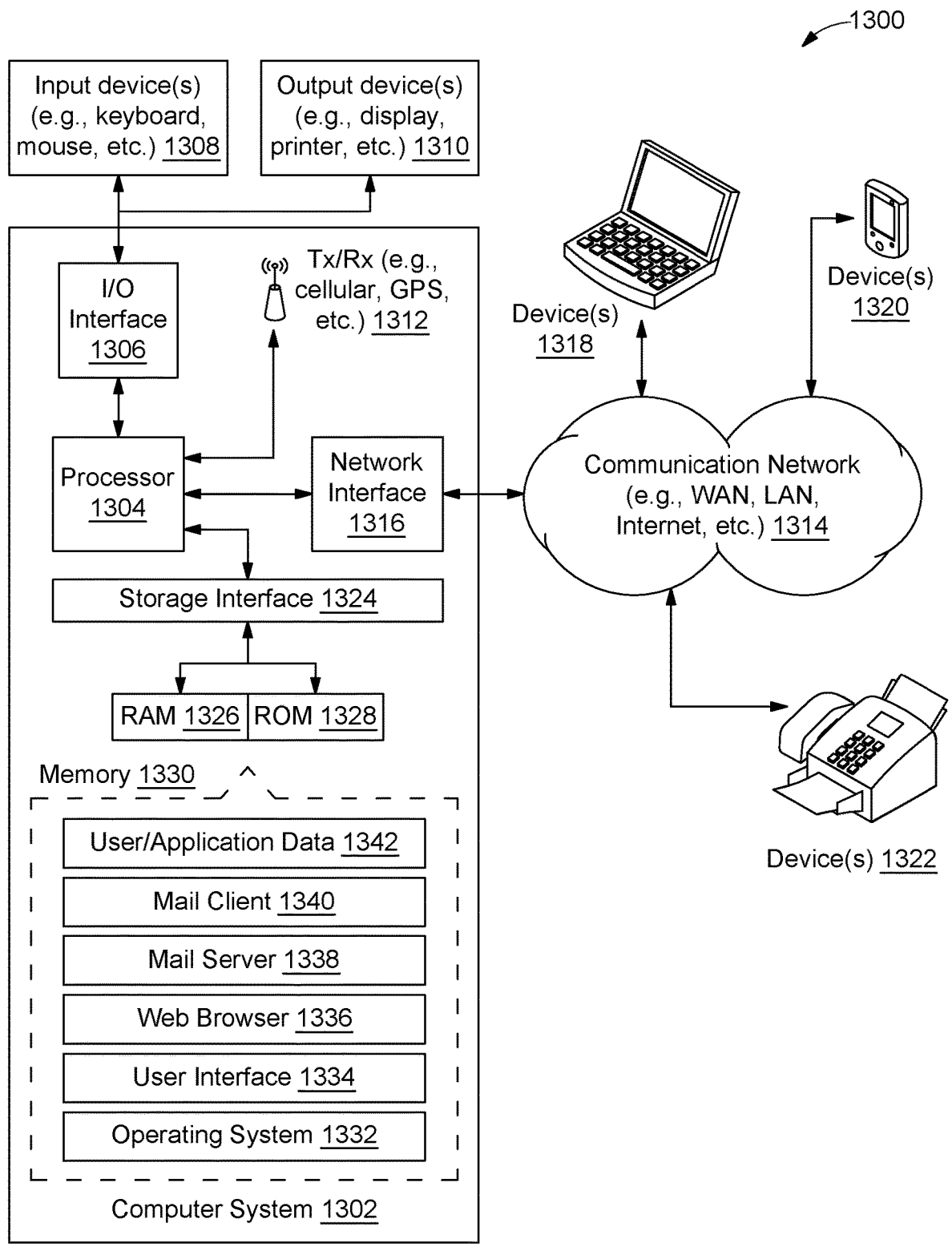
FIG. 13 illustrates a block diagram of an exemplary computer system for implementing embodiments consistent with the present disclosure.

Referring now to FIG. 13, a block diagram 1300 of an exemplary computer system 1302 for implementing various embodiments is illustrated. Computer system 1302 may include a central processing unit ("CPU" or "processor") 1304. Processor 1304 may include at least one data processor for executing program components for executing user or system-generated requests. A user may include a person, a person using a device, such as those included in this disclosure, or such a device itself. Processor 1304 may include specialized processing units such as integrated system (bus) controllers, memory management control units, floating point units, graphics processing units, digital signal processing units, etc. Processor 1304 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors. Processor 1304 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1304 may be disposed in communication with one or more input/output (I/O) devices via an I/O interface 1306. The I/O interface 1306 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1306, computer system 1302 may communicate with one or more I/O devices. For example, an input device 1308 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1310 may be a printer, fax machine, video display (for example, cathode ray tube (CRT), liquid crystal display (LCD), light-emitting diode (LED), plasma, or the like), audio speaker, etc. In some embodiments, a transceiver 1312 may be disposed in connection with processor 1304. Transceiver 1312 may facilitate various types of wireless transmission or reception. For example, transceiver 1312 may include an antenna operatively connected to a transceiver chip (for example, TEXAS® INSTRUMENTS WILINK WL 1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1304 may be disposed in communication with a communication network 1314 via a network interface 1316. Network interface 1316 may communicate with communication network 1314. Network interface 1316 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1314 may include, without limitation, a direct interconnection, local area network (LAN), wide area network (WAN), wireless network (for example, using Wireless Application Protocol), the Internet, etc. Using network interface 1316 and communication network 1314, computer system 1302 may communicate with devices 1318, 1320, and 1322. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1302 may itself embody one or more of these devices.

In some embodiments, processor 1304 may be disposed in communication with one or more memory devices (for example, RAM 1326, ROM 1328, etc.) via a storage interface 1324. Storage interface 1324 may connect to memory 1330 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1330 may store a collection of program or database components, including, without limitation, an operating system 1332, user interface application 1334, web browser 1336, mail server 1338, mail client 1340, user/application data 1342 (for example, any data variables or data records discussed in this disclosure), etc. Operating system 1332 may facilitate resource management and operation of computer system 1302. Examples of operating systems 1332 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1334 may facilitate display, execution, interaction, manipulation, or operation of program components through textual or graphical facilities. For example, user interfaces may provide computer interaction interface elements on a display system operatively connected to computer system 1302, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1302 may implement a web browser 1336 stored program component. Web browser 1336 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1302 may implement a mail server 1338 stored program component. Mail server 1338 may be an Internet mail server such as MICROSOFT® EXCHANGE® mail server, or the like. Mail server 1338 may utilize facilities such as ASP, ActiveX, ANSI C++/C#, MICROSOFT.NET® programming language, CGI scripts, JAVA® programming language, JAVASCRIPT® programming language, PERL® programming language, PHP® programming language, PYTHON® programming language, WebObjects, etc. Mail server 1338 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1302 may implement a mail client 1340 stored program component. Mail client 1340 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 1302 may store user/application data 1342, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

Various embodiments provide method and system for providing recommendations to users by securely accessing user sensitive data in a trusted execution environment (TEE). The disclosed method and system may receive a request comprising a unique user identifier for accessing user sensitive data corresponding to at least one user. The user sensitive data may be prestored in a data repository. Further, the disclosed method and system may validate a source of the request. The source of the request may be at least one of an untrusted application and a trusted application. In order to validate the source of the request, the disclosed method and system may compare the unique user identifier with an application registry. The application registry may include a list of trusted applications mapped with the unique user identifier and a unique secret key. Further, the disclosed method and system may provide an access to the user sensitive data upon identifying the source of the request to be the trusted application. In order to provide the access, the disclosed method and system may host a secure application session with the trusted application based on the unique secret key. Moreover, the disclosed method and system may process the user sensitive data for generating one or more user specific product and service recommendations corresponding to each of the at least one user. In addition, the disclosed method and system may render the one or more user specific product and service recommendations to each of the at least one user.

The method and system provide some advantages like, the method and system may increase use of user personal information in every type of computations with end user digital approval per use rather than existing ambiguous terms of use by each service provider that user does not understand clearly. Further, the method and system may enable user to control access of their personal information along with a personalized product or service of interest. In addition, the method and system may eliminate requirement of third-party product and service providers to store user personal information, thereby enabling the service providers to gain confidence of their customers. Moreover, the disclosed method and system may ensure that the personal information of the user may be stored in a central data repository of user's choice and no other entity or organization has access to the central data repository.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for providing recommendations to users by securely accessing user sensitive data in a trusted execution environment (TEE), the method comprising:
   receiving, by an electronic device, a request comprising a unique user identifier for accessing user sensitive data corresponding to at least one user, wherein the user sensitive data is prestored in a data repository;
   validating, by the electronic device, a source of the request, wherein the source of the request is at least one of an untrusted application and a trusted application, and wherein validating the source of the request comprises:
      comparing, by the electronic device, the unique user identifier with an application registry, wherein the application registry comprises a list of trusted applications mapped with the unique user identifier and a unique secret key;
   providing, by the electronic device, an access to the user sensitive data upon identifying the source of the request to be the trusted application, wherein providing the access comprises:
      hosting, by the electronic device, a secure application session with the trusted application based on the unique secret key;
   processing, by the electronic device via a trained Artificial Intelligence (AI) model, the user sensitive data for generating one or more user specific product and service recommendations corresponding to each of the at least one user; and
   rendering, by the electronic device, the one or more user specific product and service recommendations to each of the at least one user.

2. The method of claim 1, wherein the user sensitive data comprises at least one of name, address, current location, medical history, travel history, user interests, or personalized preferences of user.

3. The method of claim 1, wherein validating the source of the request further comprises:
   denying the access to the user sensitive data upon identifying the source of the request to be the untrusted application.

4. The method of claim 3, wherein identifying the source of the request to be the untrusted application comprises:
   requesting, from the source of the request, the unique secret key for accessing the user sensitive data; and
   denying the access of the user sensitive data upon failure of receiving the unique secret key from the source of the request.

5. The method of claim 1, wherein identifying the source of the request to be the trusted application comprises:
   requesting, from the source of the request, the unique secret key for accessing the user sensitive data; and
   providing the access to the user sensitive data upon receiving the unique secret key from the source of the request.

6. The method of claim 1, wherein providing the access to the user sensitive data comprises:
   matching the unique secret key with an application from the list of trusted applications stored in the application registry; and
   routing the received request for accessing the user sensitive data to the application.

7. The method of claim 1, wherein generating the one or more user specific product and service recommendations comprises:
   extracting, by the electronic device, the user sensitive data securely from the data repository with the unique secret key for each of the at least one user based on the unique user identifier; and processing, by the electronic device, the extracted user sensitive data via the trained AI model to generate the one or more user specific product and service recommendations.

8. A method for creating a trusted execution environment (TEE) for securely accessing sensitive data via a registered application, the method comprising:
receiving, by an electronic device, a request comprising a set of information associated with a plurality of applications, wherein the set of information comprises an Internet Protocol (IP) address, a name, a characteristic, and a type of each of the plurality of applications;
generating, by the electronic device, a unique secret key for each of the plurality of applications based on the associated set of information, wherein the unique secret key is generated based on configurations of the electronic device;
mapping, by the electronic device, each of the plurality of applications with the generated unique secret key, wherein mapping each of the plurality of applications with the generated unique secret key comprising:
embedding, by the electronic device, the associated unique secret key to each of the plurality of applications; and
registering, by the electronic device, each of the plurality of applications as a trusted application based on the associated unique secret key to create the TEE; and
assessing, by the electronic device via the plurality of applications, a user sensitive data associated with each of a plurality of users in the created TEE.

9. The method of claim 8, further comprising storing each of the plurality of applications along with the generated unique secret key in an application registry.

10. A system for providing recommendations to users by securely accessing user sensitive data in a trusted execution environment (TEE), the system comprising:
a processor; and
a memory communicatively coupled to the processor, wherein the memory stores processor-executable instructions, which, on execution, causes the processor to:
receive a request comprising a unique user identifier for accessing user sensitive data corresponding to at least one user, wherein the user sensitive data is prestored in a data repository;
validate a source of the request, wherein the source of the request is at least one of an untrusted application and a trusted application, and wherein validating the source of the request comprises:
compare the unique user identifier with an application registry, wherein the application registry comprises a list of trusted applications mapped with the unique user identifier and a unique secret key;
provide an access to the user sensitive data upon identifying the source of the request to be the trusted application, wherein providing the access comprises:
host a secure application session with the trusted application based on the unique secret key;
process the user sensitive data for generating one or more user specific product and service recommendations corresponding to each of the at least one user; and
render the one or more user specific product and service recommendations to each of the at least one user.

11. The system of claim 10, wherein the user sensitive data comprises at least one of name, address, current location, medical history, travel history, user interests, or personalized preferences of user.

12. The system of claim 10, wherein, to validate the source of the request, the processor-executable instructions further cause the processor to:
deny the access to the user sensitive data upon identifying the source of the request to be the untrusted application.

13. The system of claim 12, wherein, to identify the source of the request to be the untrusted application, the processor-executable instructions further cause the processor to:
request, from the source of the request, the unique secret key for accessing the user sensitive data; and
deny the access of the user sensitive data upon failure of receiving the unique secret key from the source of the request.

14. The system of claim 10, wherein, to identify the source of the request to be the trusted application, the processor-executable instructions further cause the processor to:
request, from the source of the request, the unique secret key for accessing the user sensitive data; and
provide the access to the user sensitive data upon receiving the unique secret key from the source of the request.

15. The system of claim 10, wherein, to provide the access to the user sensitive data, the processor-executable instructions further cause the processor to:
match the unique secret key with an application from the list of trusted applications stored in the application registry; and
route the received request for accessing the user sensitive data to the application.

16. The system of claim 10, wherein, to generate the one or more user specific product and service recommendations, the processor-executable instructions further cause the processor to:
extract the user sensitive data securely from the data repository with the unique secret key for each of the at least one user based on the unique user identifier; and
process the extracted user sensitive data via a trained Artificial Intelligence (AI) model to generate the one or more user specific product and service recommendations.

17. The system for creating a trusted execution environment (TEE) for securely accessing sensitive data via a registered application, the system comprising:
a processor; and
a memory communicatively coupled to the processor, wherein the memory stores processor-executable instructions, which, on execution, causes the processor to:
receive a request comprising a set of information associated with a plurality of applications, wherein the set of information comprises an Internet Protocol (IP) address, a name, a characteristic, and a type of each of the plurality of applications;
generate a unique secret key for each of the plurality of applications based on the associated set of information, wherein the unique secret key is generated based on configurations of an electronic device;
map each of the plurality of applications with the generated unique secret key, wherein mapping each of the plurality of applications with the generated unique secret key comprising:
embed the associated unique secret key to each of the plurality of applications; and register each of the plurality of applications as a trusted application based on the associated unique secret key to create the TEE; and assess, via the plurality of applications, a user sensitive data associated with each of a plurality of users in the created TEE.

18. The system of claim 17, wherein the processor-executable instructions further cause the processor to store each of the plurality of applications along with the generated unique secret key in an application registry.

19. A non-transitory computer-readable storage medium for providing recommendations to users by securely accessing user sensitive data in a trusted execution environment (TEE), having stored thereon, a set of computer-executable instructions causing a computer comprising one or more processors to perform steps comprising:

receiving a request comprising a unique user identifier for accessing user sensitive data corresponding to at least one user, wherein the user sensitive data is prestored in a data repository;

validating a source of the request, wherein the source of the request is at least one of an untrusted application and a trusted application, and wherein validating the source of the request comprises:

comparing the unique user identifier with an application registry, wherein the application registry comprises a list of trusted applications mapped with the unique user identifier and a unique secret key;

providing an access to the user sensitive data upon identifying the source of the request to be the trusted application, wherein providing the access comprises:

hosting a secure application session with the trusted application based on the unique secret key;

processing, via a trained Artificial Intelligence (AI) model, the user sensitive data for generating one or more user specific product and service recommendations corresponding to each of the at least one user; and rendering the one or more user specific product and service recommendations to each of the at least one user.

* * * * *